US010636035B1

(12) United States Patent
Matson et al.

(10) Patent No.: US 10,636,035 B1
(45) Date of Patent: Apr. 28, 2020

(54) EXPEDITED POINT-OF-SALE MERCHANT PAYMENTS

(71) Applicant: Square, Inc., San Francisco, CA (US)

(72) Inventors: Kyle Matson, San Francisco, CA (US); Wesley Kim, San Francisco, CA (US); Christopher Lang Mocko, San Francisco, CA (US); Robert Harrison Gilliam, San Francisco, CA (US); Edward Chung, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 240 days.

(21) Appl. No.: 15/665,076

(22) Filed: Jul. 31, 2017

Related U.S. Application Data

(63) Continuation of application No. 14/732,191, filed on Jun. 5, 2015, now Pat. No. 9,727,869.

(51) Int. Cl.
*G06Q 20/00* (2012.01)
*G06Q 20/40* (2012.01)
*G06Q 20/20* (2012.01)

(52) U.S. Cl.
CPC ......... *G06Q 20/407* (2013.01); *G06Q 20/202* (2013.01)

(58) Field of Classification Search
CPC ....... G06Q 20/10; G06Q 20/40; G06Q 20/407
USPC ..................................... 705/40, 35
See application file for complete search history.

(56) References Cited

U.S. PATENT DOCUMENTS

| | | | |
|---|---|---|---|
| 5,819,226 A | 10/1998 | Gopinathan et al. |
| 6,330,546 B1 | 12/2001 | Gopinathan et al. |
| 7,297,723 B2 | 11/2007 | Wilke et al. |
| 7,578,438 B2 | 8/2009 | Hogg et al. |
| 7,596,260 B2 | 9/2009 | Tedesco et al. |
| 7,620,592 B2 | 11/2009 | O'Mara et al. |
| 7,653,598 B1 | 1/2010 | Hamilton et al. |
| 7,668,769 B2 | 2/2010 | Baker et al. |
| 7,702,583 B1 | 4/2010 | Hamilton et al. |
| 7,788,195 B1 | 8/2010 | Subramanian et al. |

(Continued)

FOREIGN PATENT DOCUMENTS

| | | |
|---|---|---|
| WO | 2014/087179 A1 | 6/2014 |
| WO | 2016/011170 A1 | 6/2016 |

OTHER PUBLICATIONS

"3.2.4.3.1. sklearn.ensemble.RandomForestClassifier," Scikit Learn, Retrieved from the Internet URL: http://scikit-learn.org/stable/modules/generated/sklearn.ensemble.RandomForestClassifier.html, on Mar. 14, 2016, pp. 1-11.

(Continued)

*Primary Examiner* — Oluseye Iwarere
(74) *Attorney, Agent, or Firm* — Lee & Hayes, P.C.

(57) ABSTRACT

A payment service is configured to support purchase transactions generated by merchant point-of-sale (POS) devices. As transactions are conducted, the payment service evaluates, for each transaction, the risk of subsequent chargeback. The payment service then notifies the merchant that expedited payment is available for transactions having low risks of chargeback. The merchant can select a user interface element to initiate expedited payment of the transactions via a debit card linked to the merchant's bank account. Other transactions are settled in a non-expedited manner, using a batch funds transfer.

20 Claims, 8 Drawing Sheets

(56) References Cited

U.S. PATENT DOCUMENTS

| | | |
|---|---|---|
| 7,792,405 B2 | 9/2010 | Stoesz et al. |
| 7,809,617 B1 | 10/2010 | Hamilton et al. |
| 7,912,773 B1 | 3/2011 | Subramanian et al. |
| 7,970,701 B2 | 6/2011 | Lewis et al. |
| 8,005,737 B2 | 8/2011 | Hammad |
| 8,020,763 B1 | 9/2011 | Kowalchyk et al. |
| 8,027,912 B1 | 9/2011 | Thomas |
| 8,224,723 B2 | 7/2012 | Bosch et al. |
| 8,417,650 B2 | 4/2013 | Graepel et al. |
| 8,676,726 B2 | 3/2014 | Hore et al. |
| 8,885,894 B2 | 11/2014 | Rowen et al. |
| 9,336,494 B1 | 5/2016 | Purpura et al. |
| 9,384,493 B2 | 7/2016 | Harris et al. |
| 9,454,733 B1 | 9/2016 | Purpura et al. |
| 9,508,075 B2 | 11/2016 | Geckle et al. |
| 9,524,501 B2 | 12/2016 | Weber |
| 9,607,336 B1 | 3/2017 | Dean et al. |
| 9,727,869 B1* | 8/2017 | Matson ............ G06Q 20/202 |
| 9,773,227 B2 | 9/2017 | Zoldi et al. |
| 9,836,786 B1* | 12/2017 | Baker ............ G06Q 40/00 |
| 9,842,175 B2 | 12/2017 | Steinberg et al. |
| 9,852,427 B2 | 12/2017 | Caldera |
| 9,888,007 B2 | 2/2018 | Caldera et al. |
| 9,892,465 B2 | 2/2018 | Love et al. |
| 9,898,509 B2 | 2/2018 | Saperstein et al. |
| 9,906,402 B2 | 2/2018 | Ramachandran et al. |
| 9,910,980 B2 | 3/2018 | Kolacinski et al. |
| 9,911,110 B2 | 3/2018 | Scott et al. |
| 9,912,648 B2 | 3/2018 | Taylor, III et al. |
| 10,043,217 B1 | 8/2018 | Bolden et al. |
| 10,062,078 B1 | 8/2018 | Boates et al. |
| 10,068,235 B1 | 9/2018 | Boates et al. |
| 2002/0095360 A1 | 7/2002 | Joao |
| 2002/0120537 A1 | 8/2002 | Morea et al. |
| 2002/0139837 A1 | 10/2002 | Spitz et al. |
| 2004/0078105 A1 | 4/2004 | Moon et al. |
| 2004/0172360 A1* | 9/2004 | Mabrey ............ G06Q 20/102 705/40 |
| 2004/0230527 A1 | 11/2004 | Hansen et al. |
| 2005/0144097 A1 | 6/2005 | Lundberg |
| 2006/0059073 A1 | 3/2006 | Walzak |
| 2007/0011030 A1* | 1/2007 | Bregante ............ G06F 19/328 705/4 |
| 2007/0050840 A1 | 3/2007 | Grandcolas et al. |
| 2007/0094137 A1 | 4/2007 | Phillips et al. |
| 2008/0015985 A1* | 1/2008 | Abhari ............ G06Q 20/10 705/42 |
| 2008/0033877 A1 | 2/2008 | Blair et al. |
| 2008/0040261 A1* | 2/2008 | Nix ............ G06O 20/04 705/39 |
| 2008/0140564 A1* | 6/2008 | Tal ............ G06Q 20/02 705/39 |
| 2008/0235123 A1 | 9/2008 | Olliphant et al. |
| 2008/0288405 A1 | 11/2008 | John |
| 2009/0094125 A1* | 4/2009 | Killian ............ G06Q 20/0855 705/17 |
| 2009/0164325 A1* | 6/2009 | Bishop ............ G06Q 20/02 705/17 |
| 2009/0164326 A1* | 6/2009 | Bishop ............ G06Q 20/02 705/19 |
| 2009/0164328 A1* | 6/2009 | Bishop ............ G06Q 20/02 705/19 |
| 2009/0164329 A1* | 6/2009 | Bishop ............ G06Q 20/02 705/19 |
| 2009/0164331 A1* | 6/2009 | Bishop ............ G06Q 20/02 705/19 |
| 2009/0287564 A1* | 11/2009 | Bishop ............ G06Q 20/02 705/14.38 |
| 2009/0307028 A1 | 12/2009 | Eldon et al. |
| 2010/0169170 A1 | 7/2010 | Fordyce, III et al. |
| 2010/0305976 A1* | 12/2010 | Fischer ............ G06Q 40/08 705/4 |
| 2011/0022516 A1* | 1/2011 | Gao ............ G06Q 20/04 705/40 |
| 2011/0137789 A1* | 6/2011 | Kortina ............ G06Q 20/405 705/38 |
| 2011/0159846 A1 | 6/2011 | Kemshall |
| 2011/0313835 A1 | 12/2011 | Falkenborg et al. |
| 2012/0158566 A1 | 6/2012 | Fok et al. |
| 2012/0185398 A1 | 7/2012 | Weis et al. |
| 2012/0303425 A1 | 11/2012 | Katzin et al. |
| 2013/0138563 A1* | 5/2013 | Gilder ............ G06Q 20/4016 705/44 |
| 2013/0139222 A1 | 5/2013 | Kirillin et al. |
| 2013/0253956 A1 | 9/2013 | Towne et al. |
| 2013/0275308 A1 | 10/2013 | Paraskeva et al. |
| 2013/0311369 A1 | 11/2013 | Elrod et al. |
| 2013/0346142 A1 | 12/2013 | Young |
| 2014/0074717 A1 | 3/2014 | Evans |
| 2014/0156531 A1 | 6/2014 | Poon et al. |
| 2014/0156568 A1 | 6/2014 | Ganguly et al. |
| 2014/0164154 A1 | 6/2014 | Ramaci |
| 2014/0222616 A1* | 8/2014 | Siemiatkowski ...... G06Q 20/12 705/26.8 |
| 2014/0244491 A1* | 8/2014 | Eberle ............ G06Q 20/102 705/40 |
| 2014/0288989 A1 | 9/2014 | Goeppinger |
| 2015/0006393 A1* | 1/2015 | Allin ............ G06Q 20/14 705/44 |
| 2015/0012738 A1 | 1/2015 | Shah et al. |
| 2015/0112866 A1* | 4/2015 | Muthu ............ G06Q 20/385 705/44 |
| 2015/0161609 A1 | 6/2015 | Christner |
| 2015/0186841 A1 | 7/2015 | Sar et al. |
| 2015/0220920 A1 | 8/2015 | Howe |
| 2015/0235207 A1 | 8/2015 | Murphy, Jr. et al. |
| 2015/0235208 A1 | 8/2015 | Murphy et al. |
| 2015/0242835 A1 | 8/2015 | Vaughan et al. |
| 2016/0117676 A1* | 4/2016 | Jiang ............ G06Q 20/401 705/27.1 |
| 2017/0083878 A1* | 3/2017 | Conrad ............ G06Q 50/26 |
| 2017/0109748 A1 | 4/2017 | Kote |
| 2017/0116674 A1 | 4/2017 | Howe et al. |
| 2017/0132624 A1* | 5/2017 | Muchang ............ G07G 1/0009 |
| 2017/0178134 A1 | 6/2017 | Senci et al. |
| 2017/0278089 A1* | 9/2017 | Kothari ............ G06Q 20/227 |
| 2018/0197175 A1 | 7/2018 | Groarke |
| 2018/0303577 A1* | 10/2018 | Sweeney ............ A61B 90/96 |

OTHER PUBLICATIONS

Breiman, L., "Random Forests," University of California, Berkeley, dated Jan. 2001, pp. 1-32.

Non-Final Office Action dated Feb. 17, 2016, for U.S. Appl. No. 14/732,191, of Matson, K., et al., filed Jun. 5, 2015.

Final Office Action dated Aug. 17, 2016, for U.S. Appl. No. 14/732,191, of Matson, K., et al., filed Jun. 5, 2015.

Notice of Allowance dated Apr. 4, 2017, for U.S. Appl. No. 14/732,191, of Matson, K., et al., filed Jun. 5, 2015.

Non-Final Office Action dated Apr. 11, 2017, for U.S. Appl. No. 14/332,169, of Taylor, J.M., et al., filed Jul. 15, 2014.

Notice of Allowance dated Oct. 20, 2017, for U.S. Appl. No. 14/332,169, of Taylor, J.M., et al., filed Jul. 15, 2014.

Notice of Allowance dated Apr. 25, 2018, for U.S. Appl. No. 15/181,962, of Boates, B., et al., filed Jun. 14, 2016.

Notice of Allowance dated Apr. 25, 2018, for U.S. Appl. No. 15/182,033, of Boates, B., et al., filed Jun. 14, 2016.

International Search Report and Written Opinion for PCT Application No. PCT/US2015/40601, dated Sep. 25, 2015.

Non-Final Office Action dated Oct. 1, 2019, for U.S. Appl. No. 15/665,355, of Mullins, B., et al., filed Jul. 31, 2017.

Non-Final Office Action dated Jan. 24, 2020, for U.S. Appl. No. 15/633,545, of Higgins, M., et al., filed Jun. 26, 2017.

* cited by examiner

US 10,636,035 B1

EXPEDITED POINT-OF-SALE MERCHANT PAYMENTS

RELATED APPLICATIONS

This application claims priority to and is a continuation of U.S. patent application Ser. No. 14/732,191, filed on Jun. 5, 2015 and issued on Aug. 8, 2017 as U.S. Pat. No. 9,727,869, the entire contents of which are incorporated herein by reference.

BACKGROUND

Point-of-sale (POS) devices are used by merchants to perform transactions using customers' credit cards and other payment instruments. At the time of a purchase, a transaction is implemented in a process that involves authorization and capture of a payment amount. The payment amounts of purchase transactions are recorded throughout a business day and settled as a group at some point after the business day. In many situations, the merchant may not receive the captured payment amounts until at least the next business day.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
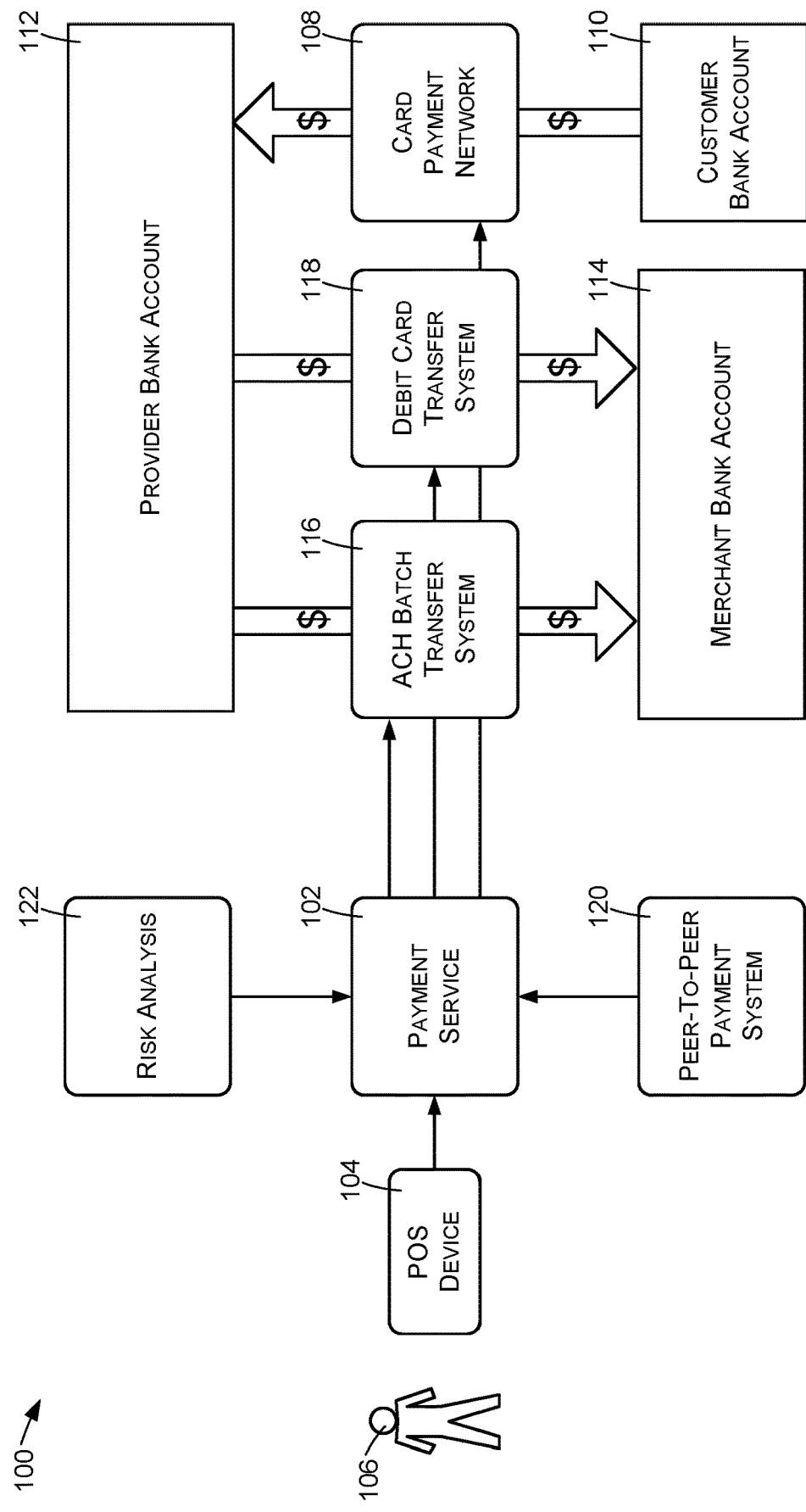
FIG. 1 is a block diagram of an example payment system that implements techniques for providing expedited payments of eligible purchase transactions to merchants.

A payment processing system may be implemented as a network-based service that receives information from merchant point-of-sale (POS) devices to conduct purchase transactions based on payment instruments provided by customers. Payment instruments may comprise credit cards, debit cards, gift cards, electronic tokens, and so forth. A POS device may perform a transaction involving a payment instrument such as this by sending one or more authorization requests to the payment processing system, followed by a capture request. Each authorization request specifies a payment amount for approval by the issuer of the payment instrument. The capture request triggers the transfer of funds from the customer to the merchant, although the actual funds transfer may not take place for some time, such as during the next business day.

As transactions are conducted and processed by the payment processing system, they are analyzed to determine their risk of subsequent chargeback. The term "chargeback" refers to a situation in which a payment amount is initially approved by a card provider network, but later reversed and charged back to the merchant due to factors such as fraud and customer complaints.

Transactions that are found to have a low risk of chargeback are considered by the payment processing system to be eligible for quick deposit into the bank account of the merchant. The term "quick deposit" as used herein refers to an expedited payment process, wherein funds corresponding to merchant sales are advanced to the merchant's account nearly immediately after a request by the merchant, in many cases before funds are actually received from the customer or card payment network.

Throughout a business day, the merchant may conduct numerous transactions. The transactions are analyzed for risk to determine which transactions are eligible for quick deposit. When one or more transactions are identified as being eligible, the eligible transactions are indicated to the merchant and the merchant is given the opportunity to initiate a quick deposit of the corresponding payment amounts. For example, a notification may be displayed on the register interface of the merchant's POS device, indicating which transactions are available for quick deposit and the corresponding payment amounts. The merchant may respond to the notification by requesting a quick deposit of the payment amounts. In some cases, the payment processing system may charge a fee for quick deposits.

Transactions that are not settled by quick deposit are settled on a non-expedited basis, such as by using an overnight batch funds transfer. Funds transferred in this manner may not appear in the merchant's bank account until the following business day. However, non-expedited payments are generally less expensive to the merchant than quick deposits.

In certain embodiments described herein, quick deposits are implemented by pushing funds to a debit card of the merchant, using a debit card processing network or service. Prior to offering quick deposits to a merchant, the payment processing system may qualify the merchant's debit card to ensure that it supports relatively rapid funds transfers into the account associated with the debit card. This may be accomplished by querying the debit card processing network or service, and/or by referencing past attempts to push funds using the debit card.

Additional details are described below. This brief introduction is provided for the reader's convenience and is not intended to limit the scope of the claims. Furthermore, the techniques described above and below may be implemented in a number of ways and in a number of contexts. Several example implementations and contexts are provided with reference to the following figures, as described below in more detail. However, the following implementations and contexts are but a few of many.

FIG. 1 shows an example system 100 that implements techniques for providing expedited, "quick deposit" payments to merchants for sales completed throughout a business day.

The system 100 includes a payment service 102 that provides purchase transaction support to businesses and thereby enables and facilitates payment processing for point-of-sale (POS) transactions between merchants and customers. More specifically, the payment service 102 may include payment processing software, hardware, and/or services that enable a merchant to receive payments from customers when conducting POS purchase transactions with the customers. For example, the payment service 102 may enable a merchant to receive credit card payments, debit card payments, mobile payments, and/or different types of electronic payments from customers.

The payment service 102 interacts with multiple POS computing devices 104, which are associated respectively with different merchants 106. The POS devices 104 are used by the merchants 106 to process payments for purchase transactions from customers. Generally, the POS devices 104 may comprise any of various types of devices, such as terminals, computers, portable devices (tablet computers, smartphones, etc.) and so forth. In some cases, the POS devices 104 may incorporate or work in conjunction with card readers for reading credit cards and/or other payment instruments. In some cases, the POS devices 104 may enable mobile payments, such by allowing a customer use a smartphone or other mobile device to pay for a purchase transaction. More generally, a POS device is configured to receive information from a payment instrument, which may comprise a physical card or an electronic token or data object, and to interact with bank-related services and networks to facilitate the transfer of funds from the customer to the merchant based on the information from the payment instrument.

Although FIG. 1 shows only a single POS device 104 associated with the merchant 106, each merchant 106 may use multiple POS devices 104 that are part of an integrated POS system. Furthermore, the POS devices 104 of a merchant POS system may be used interchangeably during a purchase transaction. That is, a transaction may be initiated on one POS device 104 and completed on another POS device 104. Similarly, a transaction may be completed on one POS device 104 and a quick deposit of the transaction amount may be initiated on another POS device 104.

The payment service 102 communicates with a card payment network 108 to initiate customer charges electronically on behalf of the merchants 106. For purposes of discussion, the card payment network 108 represents one or more card payment networks (e.g., MasterCard®, VISA®), issuing banks, acquiring banks, and other entities, banks, or institutions that may be involved in processing payment transactions and electronically transferring funds between merchants and customers.

The payment service 102 may comprise a large-scale service that supports many merchants 106, who may be distributed across large geographic areas. In some cases, the payment service 102 may implement POS services through pages of a website that are accessed by the POS device 104 of the merchant 106. In these cases, the POS device 104 may comprise a device such a tablet computer or other portable device that accesses the pages of the website using an Internet browser. In other cases, tablet computers or other devices may run special-purpose applications that are specifically configured to implement POS services in conjunction with the payment service 102, using network APIs (application program interfaces) that are made available by the payment service 102.

The term "merchant" as used herein may include any business engaged in the offering of goods or services for acquisition by customers. Actions attributed to a merchant may include actions performed by owners, employees, or other agents of the merchant and thus no distinction is made herein unless specifically discussed. In addition, as used herein, the term "customer" includes any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a purchase transaction in which the customer acquires an item from a merchant, and in return, the customer provides payment to the merchant. As used herein, the term "purchase transaction" includes a financial transaction for the acquisition of items (goods and/or services) that is conducted between a customer and a merchant, including the rental, leasing, borrowing, licensing, etc. of items.

A customer pays for a purchase transaction by providing a payment instrument such as a debit card, a credit card, a stored-value card, a check, an electronic token provided by a device carried by the customer, etc. The merchant can interact with the POS device 104 to process the transaction, such as by inputting (e.g., manually, via a magnetic card reader, NFC (near-field communications sensor), RFID (radio frequency identifier) reader, etc.) an identifier associated with the payment instrument. For example, a payment instrument of one of the customers may include one or more magnetic strips for providing card and customer information when swiped in a card reader. In other examples, other types of payment cards may be used, such as smart cards having built-in memory chips, RFID tags, NFC chips, etc. that are read by the device 104 when the cards are "dipped" into the reader. The merchant and/or the POS device 104 may also provide other information describing the transaction, such as a payment amount, the item(s) being purchased, a time, place and date of the transaction, a card network associated with the payment instrument, an issuing bank of the payment instrument, and so forth.

The POS device 104 sends the transaction information to the payment service 102 over a data communications network (not shown) with instructions to obtain payment of the specified payment amount. The payment service 102 in turn communicates with the card payment network 108 to authorize and capture the payment amount on behalf of the merchant 106.

If the transaction is successfully authorized, the card payment network 108 transfers money from a customer bank account 110, which is linked to or associated with the payment instrument of the customer, to a provider bank account 112 of the payment service 102, which is a bank account associated with the payment service 102 and/or the provider of the payment service 102. This process may be repeated for different types of payment instruments, card networks, etc.

Note that although only a single customer bank account 110 is shown in FIG. 1, the card payment network 108 may transfer funds from the bank accounts of many different customers who have completed purchase transactions with the merchant 106 throughout the day. Note also that actual fund transfers from the customer bank account to the provider bank account may not take place contemporaneously with the authorization and capture of payment amounts. Rather, the funds may be transferred during a settlement process that may not conclude until much later.

Because the payment service 102 settles transactions on behalf of the merchant 106, at some point the payment service 102 transfers funds corresponding to sales of the merchant 106 to a merchant bank account 114 that is associated with the merchant 106. As will be described in more detail below, funds transfers from the provider bank account 112 to the merchant bank account 114 may be performed using an ACH (automatic clearing house) batch transfer system 116 or by using a debit card transfer system 118. Note that although FIG. 1 shows a single merchant bank account 114, a merchant may have multiple bank accounts used by the payment service 102 for different purposes. For example, quick deposits may be made into one merchant bank account and ACH deposits may be made into a different bank account.

The system of FIG. 1 results in the decoupling of payments by customers and payments to merchants. That is, payment amounts may be transferred to the merchant bank account 114 independently of being transferred from the customer bank account 110. In certain embodiments, the payment service 102 may advance funds from the provider bank account 112 to the merchant bank account 114 for captured payment amounts, even before the payment amounts have been received in the provider bank account 112 from the customer bank account 110.

As mentioned, the transfer of payment amounts from the provider bank account 112 to the merchant account may in some cases be performed using an ACH batch transfer system 116. ACH is an electronic financial network that processes large volumes of electronic funds transfers in batches. The payment service 102 is configured to record captured payment amounts for the merchant 106 (as well as for other merchants) throughout a business day, and at the end of the business day to submit those payment amounts as a batch for transfer by the ACH batch transfer system 116 from the provider bank account 112 to the merchant bank accounts 114 of multiple merchants 106. In many cases, batch transfers initiated at the end of a business day result in funds being transferred into the merchant bank account 114 later in the business day, by the beginning of the next business day, or at some later time during the next business day.

In some cases, certain payment amounts, for certain captured transactions, may be transferred using the debit card transfer system 118. Assuming that the merchant bank account 114 is linked to an associated debit card, the debit card transfer system 118 can be used to perform an expedited transfer of funds from the provider bank account 112 to the merchant bank account 114, in which funds can be nearly immediately transferred into the merchant bank account 114. Although this may involve additional fees, such fees may at times be justifiable to a merchant in return for receiving quick access to funds, especially for large transactions.

The payment service 102 is configured to offer expedited funds transfers, also referred to herein as "quick deposits," only for certain eligible transactions, based at least in part on the evaluated risk of subsequent chargebacks for the transactions. A chargeback in this environment is the reversal of a previous transfer of funds from the customer bank account 110 to the provider bank account 112. A chargeback may occur for various reasons. For example, certain charges using a credit card may be later found to be fraudulent. As another example, some charges may be later disputed by the customer. Either of these situations may result in a chargeback, in which funds that have been received in the provider bank account 112 from the customer bank account 110 are reversed. The possibility of chargebacks is a financial risk to the provider of the payment service 102, in that the reversed funds may have already been forwarded to the merchant by way of transfer to the merchant bank account 114. This risk may be even greater in the case of expedited funds transfers, because of the much greater likelihood that the funds have been advanced to the merchant prior to receiving a chargeback notification. Because of the chargeback risk, expedited payments using the debit card transfer system 118 are offered only for transactions that are found to be eligible based on having a relatively low risk of subsequent chargeback.

The payment service 102 is configured to offer quick deposits for eligible transactions and for those merchants having debit cards that support expedited account deposits. Whether a particular debit card supports direct and expedited deposits may be determined in some cases by querying the debit card transfer system 118, which may be a third-party service designed to process debit card deposits into bank accounts associated with debit cards. In addition, the payment service 102 may receive input from a peer-to-peer payment system 120 regarding past funds transfers between individual persons using debit card accounts. For example, the peer-to-peer payment system 120 may comprise an Internet-based service that allows instant payments between individual persons using debit cards. The peer-to-peer payment system 120 may keep a record of successful transactions, including transactions in which funds were transferred within a relatively short period of time, and may also keep track of the debit cards that were used in the successful transactions. In some cases, the peer-to-peer payment system 120 may keep track of Bank Identification Numbers (BINs) associated with debit cards that have been found to support expedited deposits into associated bank accounts, and may make this information available to the payment service 102. When determining whether a merchant's debit card is able to support expedited deposits, the payment service 102 may compare the BIN of the merchant's debit card to the BINs of debit cards that have been observed by the peer-to-peer payment system 120 as having previously supported expedited deposits. Only those debit cards whose BINs correspond to the BINs of debit cards that have been previously observed to support expedited deposits are deemed as candidates for the expedited transfers described herein.

The payment service 102 may also receive input from a risk analysis component 122 to determine whether any particular transaction is eligible for an expedited payment to the merchant 106. For example, the risk analysis component 122 may estimate the risk of subsequent chargeback for any given transaction and may produce a score corresponding to the risk. The payment service 102 may compare the score to a threshold to determine whether to make the transaction eligible for expedited payment. For example, a transaction may be made eligible for expedited payment only if the risk score of the transaction is below a predetermined threshold.

The risk analysis component 122 may use various techniques and information to evaluate the risk associated with any given transaction. For example, the risk analysis component 122 may use an algorithm that considers transaction data, merchant data, and customer data. In some implementations, the risk algorithm may use a classifier to process each attribute, e.g., a number of previous transactions of each type of data to determine whether the transaction may eventually be charged back. That is, the classifier can be trained using a history of previous transactions, before being used to predict whether any particular new transaction may be eventually charged back.

In some implementations, each attribute of each type of data can be normalized and weighted by a predetermined weight. The risk algorithm may aggregate each weighted normalization, and if the sum satisfies a predetermined threshold, the risk algorithm model may determine the transaction will eventually be charged back.

Some attributes may be considered more important than others by the risk algorithm. For example, customer data such as a BIN and a purchase history can be more highly weighted than other customer data. If a customer account has a BIN that has been previously tagged as fraudulent, the risk algorithm can determine to rank the transaction as being high risk. On the other hand, the fact that a customer has frequently purchased items or services at the merchant can be a heavy weight in determining the transaction has a low risk of subsequent chargeback.

With merchant data, the risk algorithm model might weigh a type of business as important. Some types of businesses are riskier than others. For example, a construction business with traditionally high transaction amounts is considered more risky by the algorithm than a coffee shop with low transaction amounts. The risk algorithm can also give a weight to a name of the merchant. For example, the risk algorithm model can weigh a merchant's name that has special words or symbols to be a strong factor in determining the transaction is relatively risky. The risk algorithm might similarly weigh an area code that has recently had a high traffic of fraudulent activity to be a factor in determining the transaction is relatively risky. Also, the risk algorithm might compares a location of the conducted transaction to the type of business. If the type of business is immobile, e.g., a brick and mortar coffee shop, the risk algorithm may determine a transaction occurring at a location other than a primary place of business is relatively more risky. The risk algorithm can also weigh a type of operating system used by the mobile device, e.g., iOS or Android, or a type of bank account, e.g., personal or business, as small factors in the determination. These are just a few examples of possibly many different signals and factors that may be input to and considered by the risk analysis component 122.

Communications between the various components of FIG. 1, such as the POS device, the payment service 102, the card payment network 108, the ACH batch transfer system 116, the peer-to-peer payment system 120, the risk analysis component 122, and various other entities that may be associated, for example, with the customer bank account 110, the provider bank account 112, and the merchant bank account 114, may be implemented through a network infrastructure such as the Internet. More generally, communications may utilize local area networks, wide area networks, wired networks, Wi-Fi and other wireless networks, cellular data networks, close-range wireless communications such as Bluetooth®, near field communications (NFC), etc. Protocols for communicating over such networks are well known and will not be discussed herein in detail. Various types of encryption and security techniques may be employed to protect communications from eavesdroppers.

Figure 2:
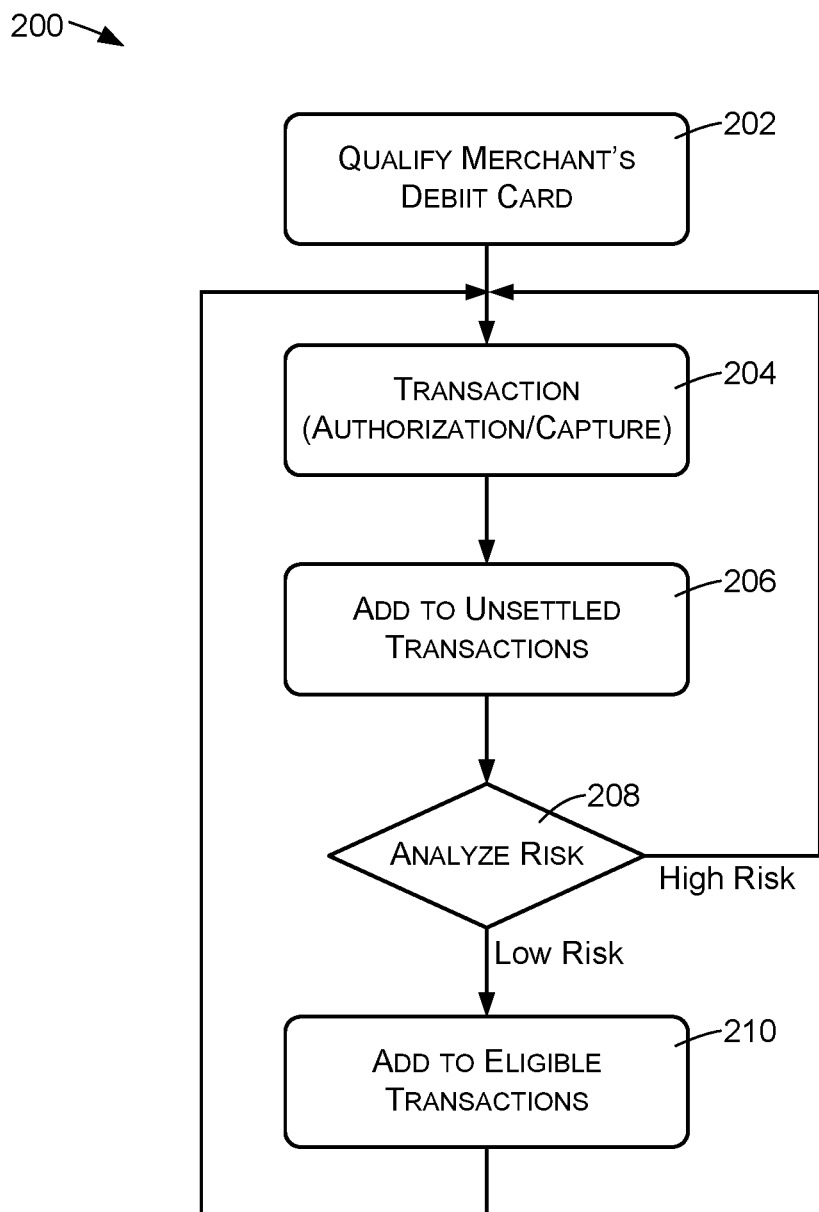
FIG. 2 is a flow diagram illustrating an example method of identifying transactions that are eligible for expedited payment.
Figures 4, 5:
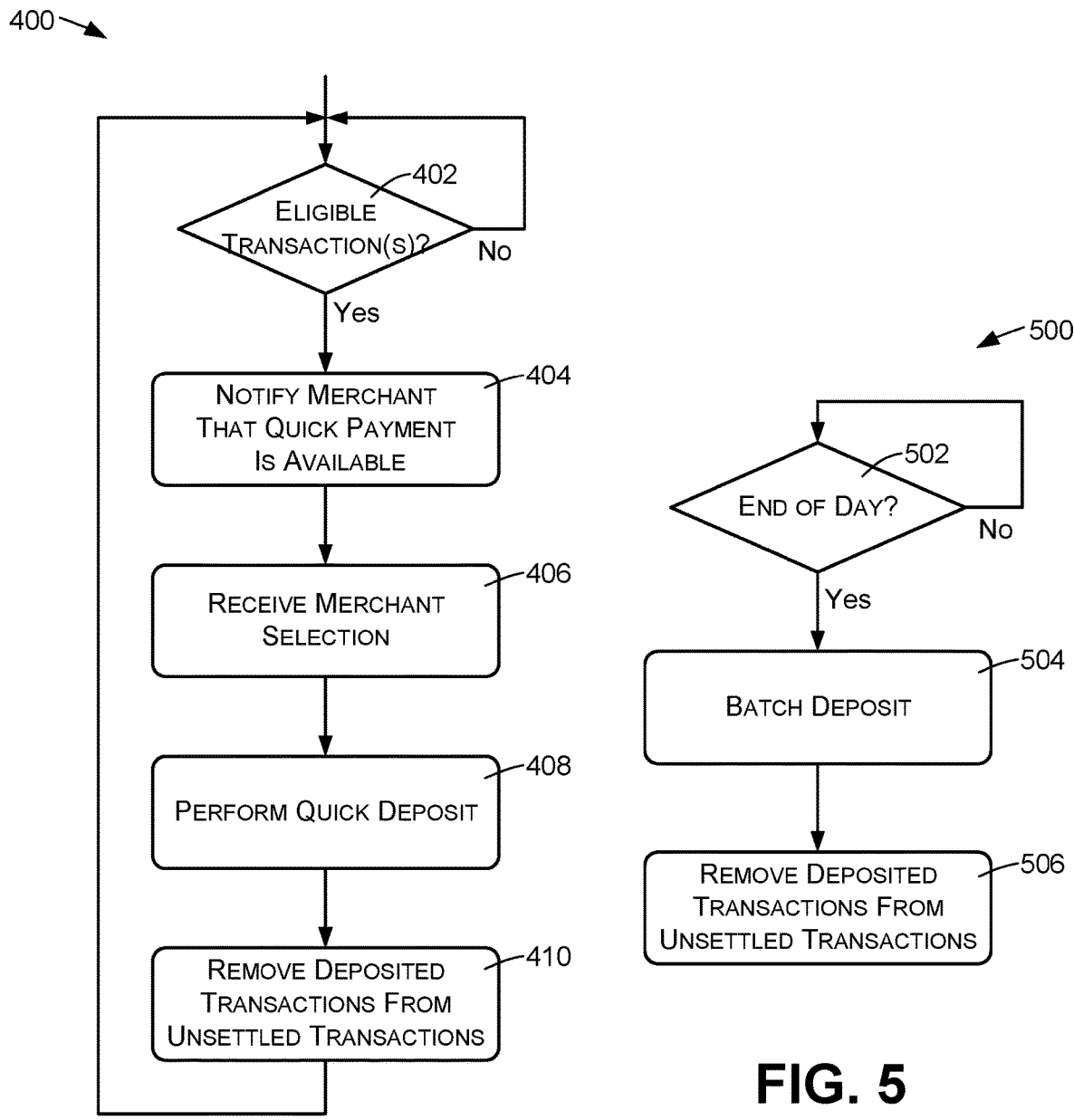
FIG. 4 is a flow diagram illustrating an example method of identifying eligible transactions to a merchant and performing expedited deposits of selected transactions.
FIG. 5 is a flow diagram illustrating an example method of performing a batch deposit for transactions for which expedited payment have not been performed.

FIG. 2 shows an example method 200 that may be used in the system 100 to process payments by the payment service 102 and the POS device 104. An initial, preparatory action 202 comprises approving or qualifying the debit card of the merchant 106 as being a card that supports relatively fast deposits into an associated bank account such as the merchant bank account 114. For the debit card to qualify, the debit card should be supported by a payment network and bank that allow fast or "instant" deposits to the merchant bank account 114, such as deposits that are completed in a matter of seconds or minutes. Whether the debit card qualifies may be determined by referencing past usage of the debit card for payment to the account of the merchant, such as usage of the debit card by a peer-to-peer payment system that transfers funds between accounts of individual persons such as friends. The action 202 is performed when the merchant wishes to link a particular debit card to his or her account with the payment service 102. Furthermore, the remaining actions of FIG. 2 as well as the actions described below with reference to FIG. 4 are performed only for merchants who have successfully submitted a debit card for qualification in this manner.

Figure 3:
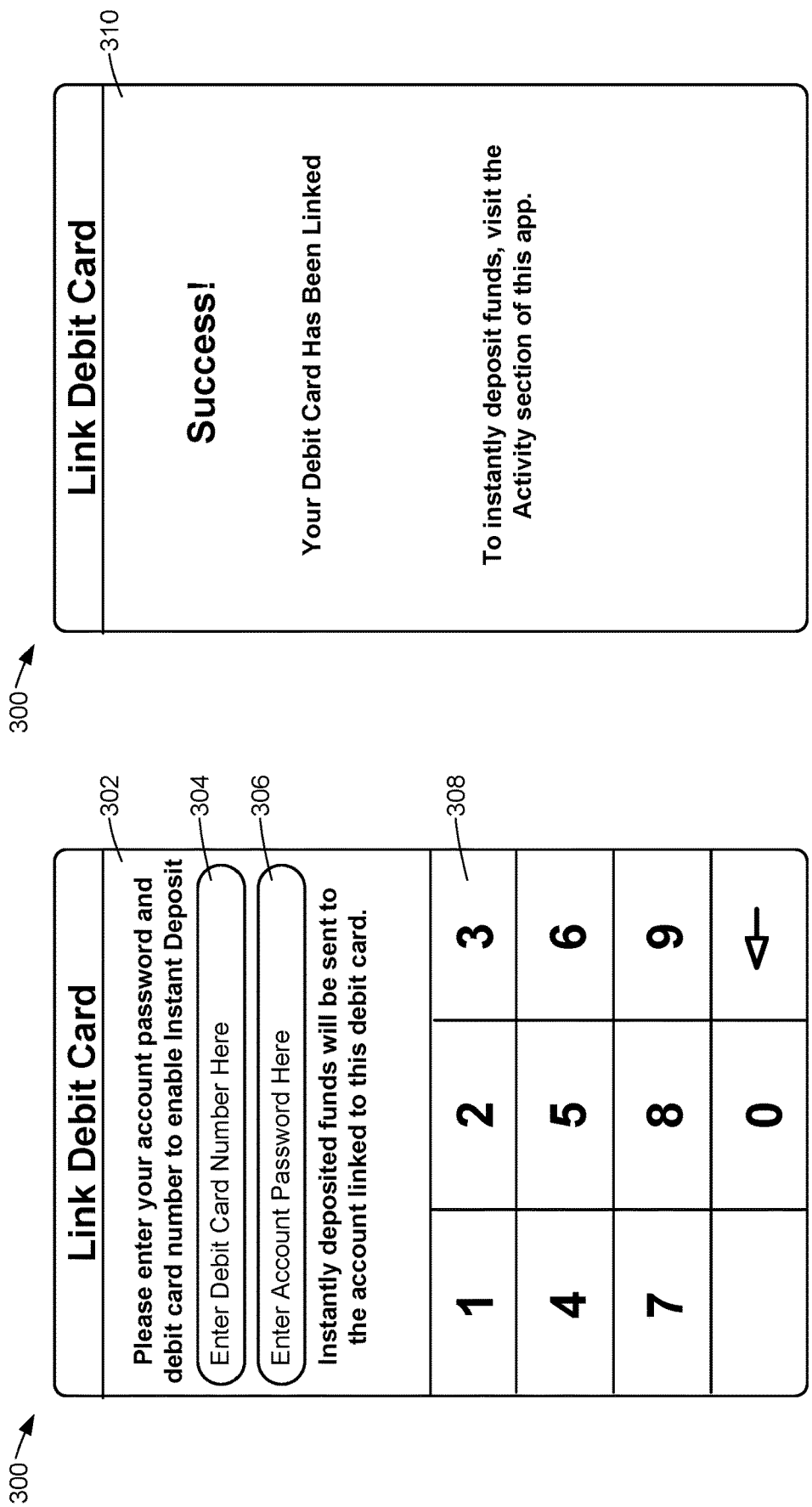
FIGS. 3A and 3B are example pages of a user interface for linking a debit card to a merchant.

FIGS. 3A and 3B show an example of a user interface 300 that may be presented to the merchant to initiate qualification of the merchant's debit card and to make the instant deposit service described herein available to the merchant 106. The user interface 300 may be displayed, for example, on a display surface or display screen of the merchant POS device 104.

The user interface 300 comprises a first page 302 that prompts the merchant for a debit card number and a password. Specifically, the first page 302 has a first field 304 into which the merchant enters the debit card number and a second field 306 into which the merchant enters a password that is associated with the merchant's account with the payment service 102. The first page 302 may also have an on-screen keyboard 308 that the merchant can use to enter the requested information. It is assumed in this example that the display of the POS device 104 is a touch-sensitive display, and that the merchant can touch various controls presented on the screen to interact and provide input.

Assuming that the debit card identified by the merchant through the first page 302 is approved for expedited payments, the user interface 300 may display a second page 310, containing text indicating to the merchant 106 that the debit card has been qualified for use in quick deposits and has been linked to the payment service user account of the merchant.

Returning to FIG. 2, an action 204 comprises initiating and conducting a purchase transaction using the merchant POS device 104. The purchase transaction may be initiated and completed in the usual manner, such as scanning or otherwise reading a payment instrument, entering a payment amount, etc. In response to receiving this information from the POS device 104, the payment service 102 communicates with the card payment network 108 to authorize and capture the payment amount of the transaction. An action 206 comprises adding the transaction to a group of unsettled transactions, which comprises those transactions that will be settled by an ACH batch transfer after the end of the current business day.

An action 208 comprises performing a risk analysis for the purchase transaction to determine a risk of subsequent chargeback for the purchase transaction, using the algorithm and techniques described above. For example, the action 208 may comprise evaluating the risk of the transaction, generating a score representing the risk, and comparing the risk score to a threshold. If the risk score is lower than the threshold, the transaction is deemed to be low risk. If the risk score is not lower than the threshold, the transaction is deemed to be high risk.

If the transaction is deemed to be low risk, an action 210 is performed, comprising adding the transaction to a list of transactions that are eligible for quick payment. Eligible transactions are those transactions that have not yet been settled or otherwise paid to the merchant, and that are considered eligible for quick deposit.

After the action 210, or if the transaction is deemed to be high risk, the actions 204, 206, and 208 are repeated for additional transactions by the merchant 106.

FIG. 4 illustrates an example method 400 that may be used in the system 100 to process quick deposits by the payment service 102 and the POS device 104. Note that in the described embodiment, the method 400 is performed only for merchants that have submitted and registered qualifying debit cards.

An action 402 comprises determining whether there are currently any transactions that are eligible for quick payment. This action may be performed as described above with reference to FIG. 2, and/or by checking whether any transactions have been added to a list of eligible transactions as a result of the method 200 of FIG. 2. If there are no eligible transactions, the action 402 is repeated until there are one or more eligible transactions.

In response to determining that there are one or more eligible transactions, for which the risk of subsequent chargeback is below a given threshold, an action 404 is performed, comprising activating or enabling a user interface on the POS device 104 indicating to the merchant that quick payment is available for the one or more eligible transactions. This may be accomplished by generating a user interface on the display of the merchant POS device indicating the transactions that are eligible for quick deposit and the amounts of the transactions. The action 404 may also comprise activating a control element, wherein the control element, when activated, can be selected by the merchant 106 to initiate an expedited payment of the one or more eligible transactions via a debit card associated with a bank account of the merchant. Examples of different user interfaces will be discussed below.

An action 406 comprises receiving an indication that the user interface element of the user interface has been selected, indicating a desire by the merchant 106 to initiate a quick payment of the one or more transactions.

In response to receiving the selection of the user interface element, an action 408 is performed of initiating or performing a quick deposit of the one or more transactions, via the debit card or debit card account of the merchant 106. For example, the POS device 104 may send an indication of the merchant selection to the payment service 102, which may respond by communicating with the debit card transfer system 118 to transfer an amount of funds corresponding to the payment amounts of the one or more eligible transactions from the provider bank account 112 to the merchant bank account 114. The transfer of funds may occur nearly immediately, such as within less than a minute after the merchant 106 selects the one or more eligible transactions for quick payment.

In conjunction with initiating or performing the quick payment of funds from the provider bank account 112 to the merchant bank account 114, an action 410 is performed of removing the paid transactions from the unsettled transactions. This ensures that the same payments will not be duplicated in the subsequent end-of-day ACH batch transfer.

The method 400 may be performed repeatedly through the course of a business day, and the merchant 106 may select a group of transactions for quick payment at any time after such transactions occur. In some embodiments, the merchant may be allowed to select individual transactions for quick payment.

FIG. 5 illustrates an example method 500 that may be performed periodically to perform a non-expedited transfer of funds corresponding to merchant sales from the provider bank account 112 to the merchant bank account 114. An action 502 comprises determining whether it is the close of a business day or another time at which a batch funds transfer is to be initiated. The action 502 is repeated until the time of day at which the funds transfer is to be initiated.

At or after the close of business, an action 504 is performed of initiating or performing a batch payment to the merchant bank account 114, wherein the batch deposit includes the payment amounts for all transactions other than those for which quick deposits were performed. This includes the transactions that are currently designated as unsettled transactions. For example, the payment service 102 may communicate with the ACH batch transfer system 116 to transfer an amount of funds corresponding to the payment amounts of the unsettled transactions from the provider bank account 112 to the merchant bank account 114. A transfer such as this may take some time to complete. In many cases, the transfer may not be complete until the beginning of the next business day.

After initiating the batch deposit, an action 506 is performed, comprising removing the transactions involved in the batch deposit from the unsettled transactions and/or deducting the payment amounts of the batch deposit from the payment amounts of the unsettled transactions.

Figure 6:
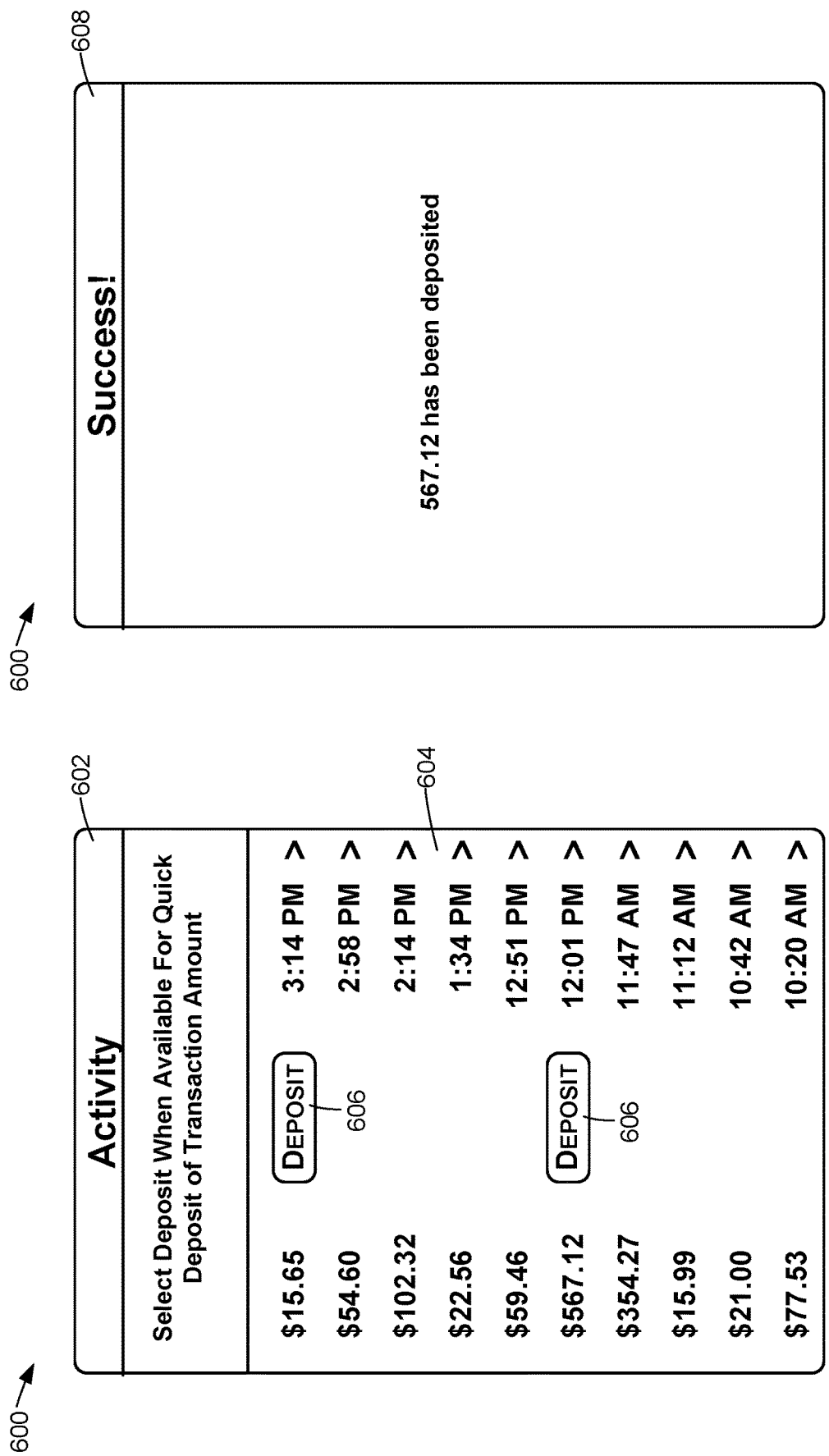
FIGS. 6A and 6B are example pages of a user interface to notify the merchant of eligible transactions and to interact with the user to initiate expedited payments for the transactions.

FIGS. 6A and 6B show an example of a user interface 600 that may be used to notify the merchant of transactions that are available for quick deposit. The user interface 600 includes a first page 602, which may be referred to as an activity page or a register page 602, which has a listing area 604 containing payment amounts of recent transactions along with the times of the transactions. For example, the area 604 may contain a scrollable list of payment amounts and times, ordered from most recent to less recent. In some cases, the activity page 602 may group transactions by date, or may contain only transactions for a particular day. In some cases, each transaction amount may be selectable to see further details regarding the corresponding transaction.

A selectable user interface control element 606 is associated with each transaction amount that is eligible for quick deposit. The control element 606 is activated for any particular transaction in response to determining that the transaction is eligible for quick deposit. The term "activate" means that the control element is made visible and/or made selectable.

When activated, the control element 606 may be selected by the merchant, such as by touching an area of the display corresponding to the displayed control element 606, to initiate a quick deposit of the corresponding transaction amount. Selecting the control element 606 causes the POS device 104 to receive the merchant selection of the corresponding transaction amount as described with reference to the action 406 of FIG. 4. In response to selecting the element 606 corresponding to a particular transaction, the actions 408 and 410 of FIG. 4 are performed with respect to the particular transaction. Afterward, a second page 608 of the user interface 600 is presented, informing the merchant of the successful quick deposit and the amount of the deposit.

In the example of FIG. 6A, transactions having amounts of $15.65 and $567.12 have been indicated as being eligible for quick deposit, and a corresponding control element 606, labeled "Deposit," is positioned respectively along with each transaction amount. FIG. 6B assumes that the user selected the control element corresponding to the $567.12 transaction amount. Subsequently, when the merchant views the first page 602, the control element 606 associated with the $567.12 transaction will no longer be visible.

Figure 7:
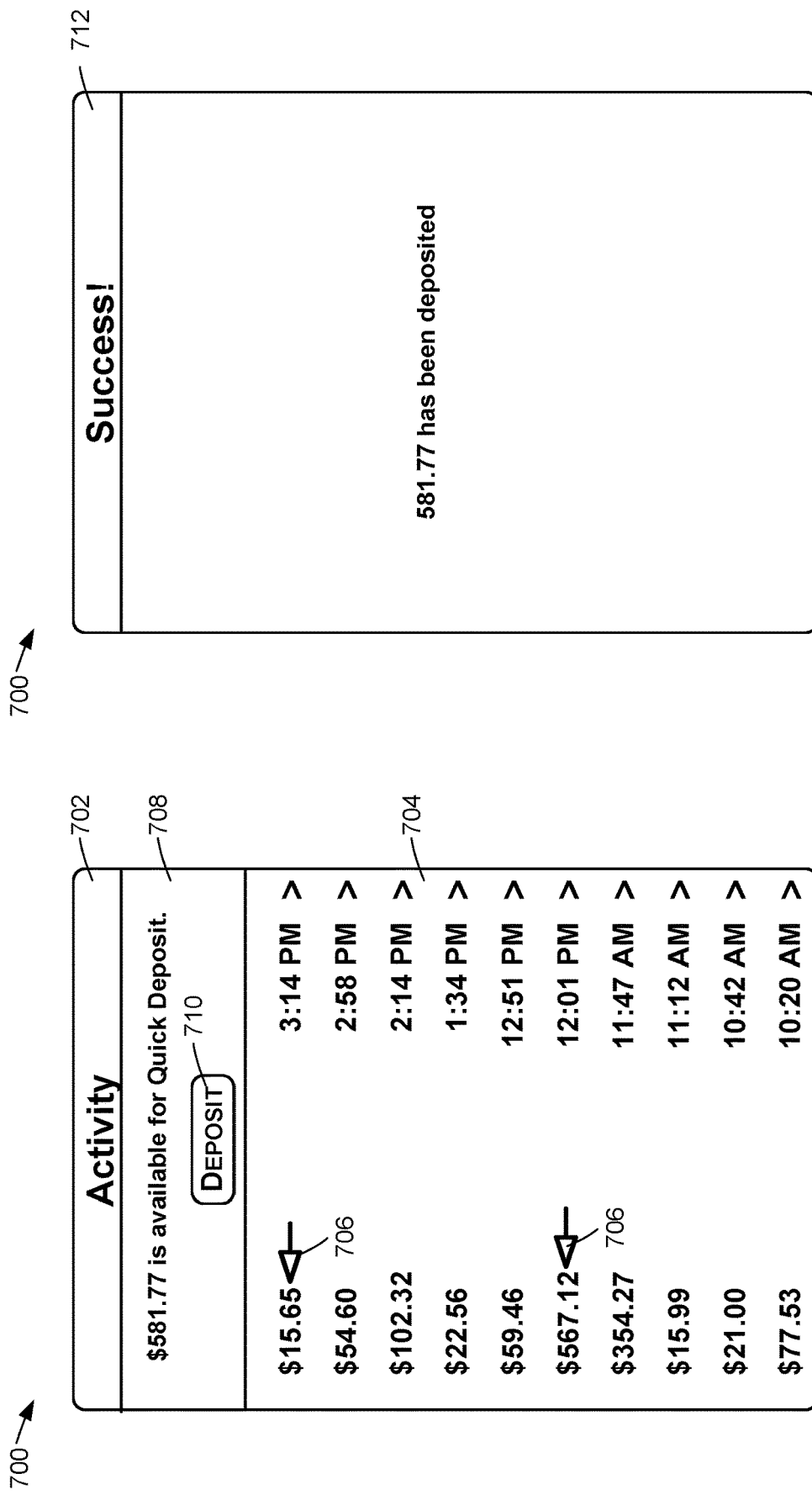
FIGS. 7A and 7B are example pages of another user interface to notify the merchant of eligible transactions and to interact with the user to initiate expedited payments for the transactions.

FIGS. 7A and 7B show another example interface 700 that may be used to notify the merchant of transactions that are available for quick deposit. In this example, the user interface allows a merchant to initiate a quick deposit of multiple eligible transactions.

The user interface 700 includes a first page 702, which may be referred to as an activity page or a register page 702. The register page 702 presents a listing area 704 containing payment amounts of recent transactions along with the times of the transactions as described above with reference to FIG. 6A. In this example, an indicator 706 is positioned next to each transaction amount that is eligible for quick deposit.

A summary area 708 indicates to the merchant that a combined amount of $581.77 is available for quick deposit, corresponding to the summed amount of the multiple eligible purchase transactions. A selectable user interface control element 710 is available within the summary area 708. The control element 710 may be selected by the merchant, such as by touching an area of the display corresponding to the displayed control element 710, to initiate a quick deposit of the combined and summed eligible transaction amounts. The summary area 708 and the control element 710 are activated only when there are one or more transactions that are available for quick deposit.

Touching or selecting the control element 710 causes the POS device 104 to receive the merchant selection of the combined transaction amounts as described with reference to the action 406 of FIG. 4. In response to selecting the element 710, the actions 408 and 410 of FIG. 4 are performed with respect to the combined payment amounts of the eligible transactions. Afterward, a second page 712 of the user interface 700 is presented (FIG. 7B) informing the merchant of the successful quick deposit and the amount of the deposit. In this example, the deposit has been in the amount of $581.77, corresponding to the sum of the two eligible transactions having payment amounts of $15.65 and $567.12.

Figure 8:
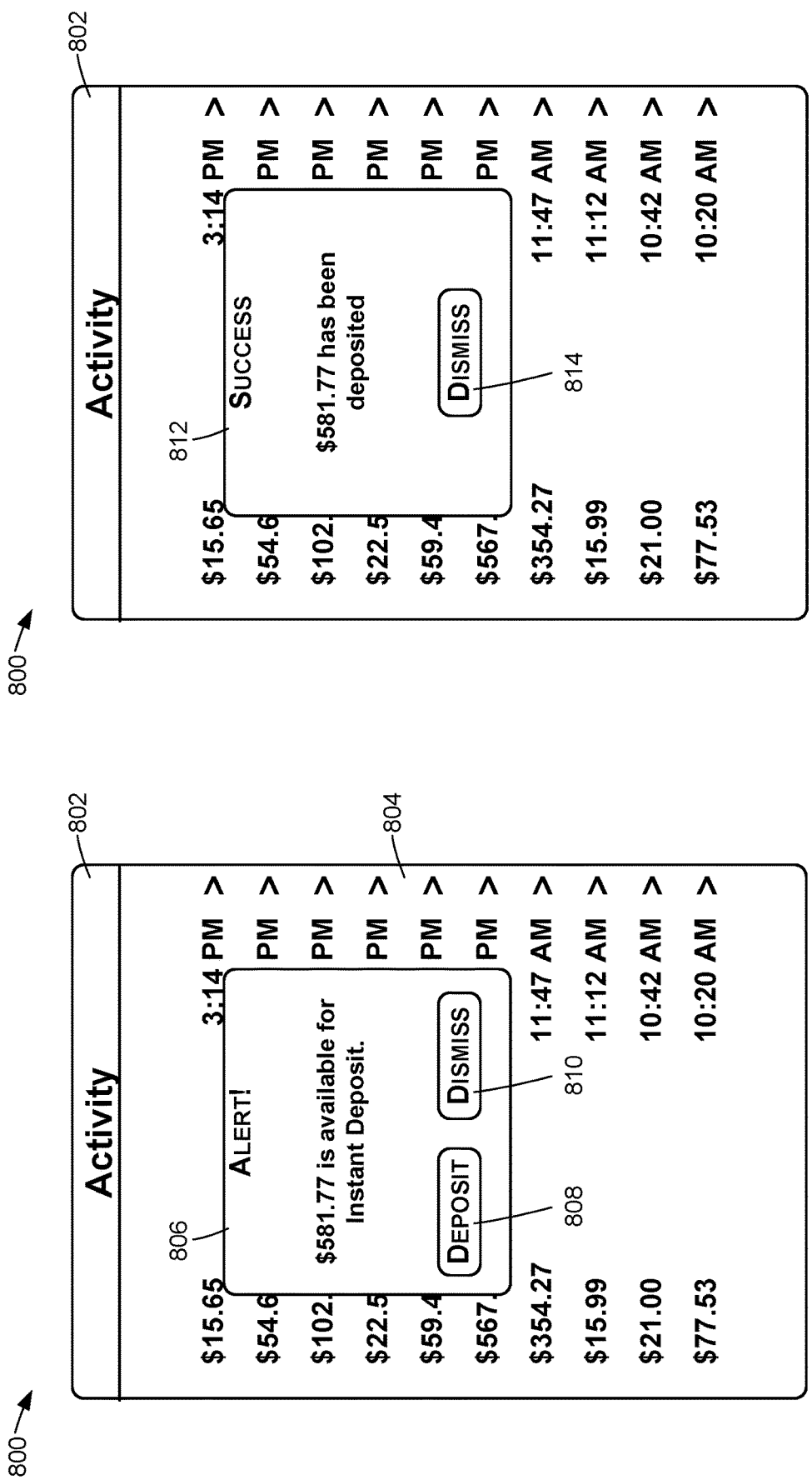
FIGS. 8A and 8B are example pages of yet another user interface to notify the merchant of eligible transactions and to interact with the user to initiate expedited payments for the transactions.

FIGS. 8A and 8B show an example of a user interface 800 that may be used to notify the merchant of transactions that are available for quick deposit. The user interface 800 includes a first page 802, which may be referred to as an activity page or a register page 802, which presents a listing area 804 containing payment amounts of recent transactions along with the time of each transaction.

Upon determining that one or more transactions are eligible for quick deposit, a display element 806 is activated and presented to the merchant. In this case, the display element comprises a pop-up notification that appears over and overlies other user interface elements of the first page 802. The pop-up notification indicates the summed amount of one or more transaction payment amounts that are eligible for quick deposit. The pop-up display element 806 includes a user-selectable display element 808, labeled "Deposit," that the merchant can select to initiate a quick deposit of the indicated payment amounts. Otherwise, the merchant can select a display element 810 labeled "Dismiss" to decline the quick deposit offer.

In response to selecting the "Deposit" display element 808, a second pop-up notification 812 is displayed over the other elements of the user interface 800, indicating the success of the quick deposit and indicating the amount of the payment that was deposited to the merchant bank account 114. The second notification 812 may have a "Dismiss" control 814 that can be selected to dismiss the notification 812.

In some embodiments, expedited payments may be made automatically for eligible purchase transactions, depending on merchant preferences. For example, the merchant may specify that all eligible transactions or those eligible transactions over a given amount are to be automatically paid using the expedited transfer methods described herein. Alternatively, a merchant may specify that all eligible transaction at the end of a business day are to be automatically paid using the expedited transfer methods described herein.

Figure 9:
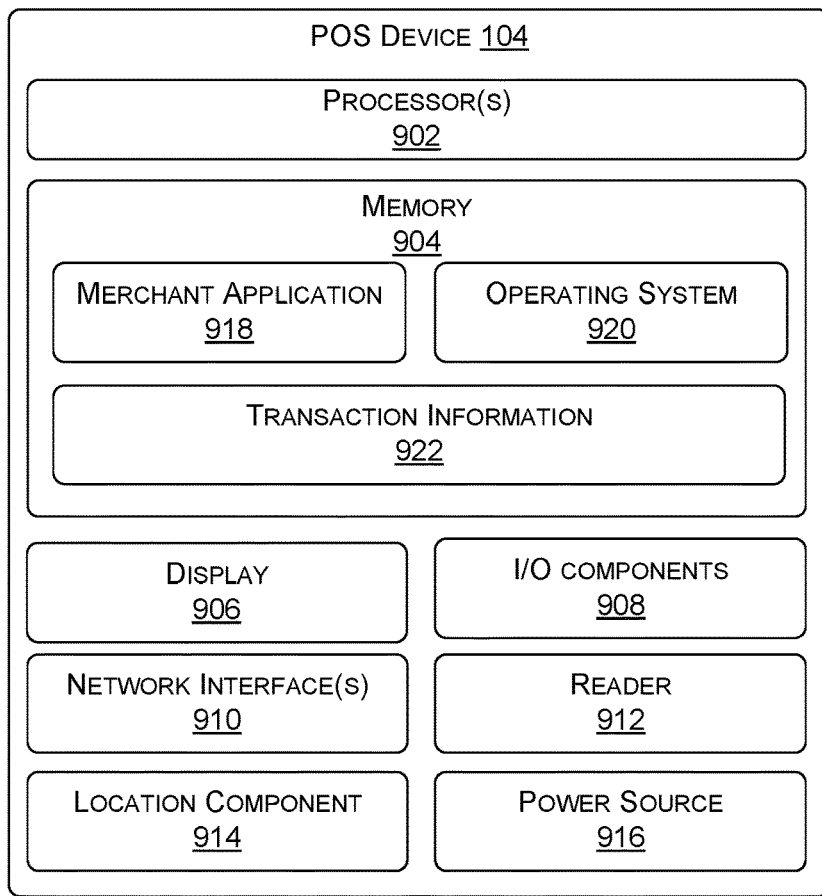
FIG. 9 is a block diagram of an example merchant point-of-sale device.

FIG. 9 illustrates select components of an example POS device 104 according to some implementations. The POS device 104 may be any suitable type of computing device, e.g., mobile, semi-mobile, semi-stationary, or stationary. Some examples of the POS device 104 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 104 includes at least one processor 902, memory 904, a display 906, one or more input/output (I/O) components 908, one or more network interfaces 910, at least one card reader 912, at least one location component 914, and at least one power source 916.

Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the memory 904.

Depending on the configuration of the POS device 104, the memory 904 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 904 may include, but is not limited to, RAM, ROM, EEPROM, flash memory, solid-state storage, magnetic disk storage, optical storage, and/or other computer-readable media technology. Further, in some cases, the POS device 104 may access external storage, such as RAID storage systems, storage arrays, network attached storage, storage area networks, cloud storage, or any other medium that can be used to store information and that can be accessed by the processor 902 directly or through another computing device or network. Accordingly, the memory 904 may be computer storage media able to store instructions, modules or components that may be executed by the processor 902. Further, when mentioned, non-transitory computer-readable media exclude media such as energy, carrier signals, electromagnetic waves, and signals per se.

The memory 904 may be used to store and maintain any number of functional components that are executable by the processor 902. In some implementations, these functional components comprise instructions or programs that are executable by the processor 902 and that, when executed, implement operational logic for performing the actions and services attributed above to the POS device 104. Functional components of the POS device 104 stored in the memory 904 may include a merchant application 918, which may present an interface on the POS device 104 to enable the merchant to conduct transactions, receive payments, and so forth, as well as communicating with the payment service 102 for processing payments and sending transaction information. Further, the merchant application 918 may present an interface to enable the merchant to manage the merchant's account, and the like.

Additional functional components may include an operating system 920 for controlling and managing various functions of the POS device 104 and for enabling basic user interactions with the POS device 104. The memory 904 may also store transaction information/data 922 that is received based on the merchant associated with the POS device 104 engaging in various transactions with customers.

In addition, the memory 904 may also store data, data structures and the like, that are used by the functional components. For example, this data may include item information that includes information about the items offered by the merchant, which may include images of the items, descriptions of the items, prices of the items, and so forth. Depending on the type of the POS device 104, the memory 904 may also optionally include other functional components and data, which may include programs, drivers, etc., and the data used or generated by the functional components. Further, the POS device 104 may include many other logical, programmatic and physical components, of which those described are merely examples that are related to the discussion herein.

The network interface(s) 910 may include one or more interfaces and hardware components for enabling communication with various other devices over a network or directly. For example, network interface(s) 910 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The I/O components 908 may include speakers, a microphone, a camera, various user controls (e.g., buttons, a joystick, a keyboard, a keypad, etc.), and/or a haptic output device, and so forth.

In addition, the POS device 104 may include or may be connectable to a payment instrument reader 912. In some examples, the reader 912 may plug in to a port in the POS device 104, such as a microphone/headphone port, a data port, or other suitable port. In other instances, the reader 912 is integral with the POS device 104. The reader 912 may include a read head for reading a magnetic strip of a payment card, and further may include encryption technology for encrypting the information read from the magnetic strip. Alternatively, numerous other types of card readers may be employed with the POS devices 104 herein, depending on the type and configuration of a particular POS device 104.

The location component 914 may include a GPS device able to indicate location information, or the location component 914 may comprise any other location-based sensor. The POS device 104 may also include one or more additional sensors (not shown), such as an accelerometer, gyroscope, compass, proximity sensor, and the like. Additionally, the POS device 104 may include various other components that are not shown, examples of which include removable storage, a power control unit, and so forth.

Figure 10:
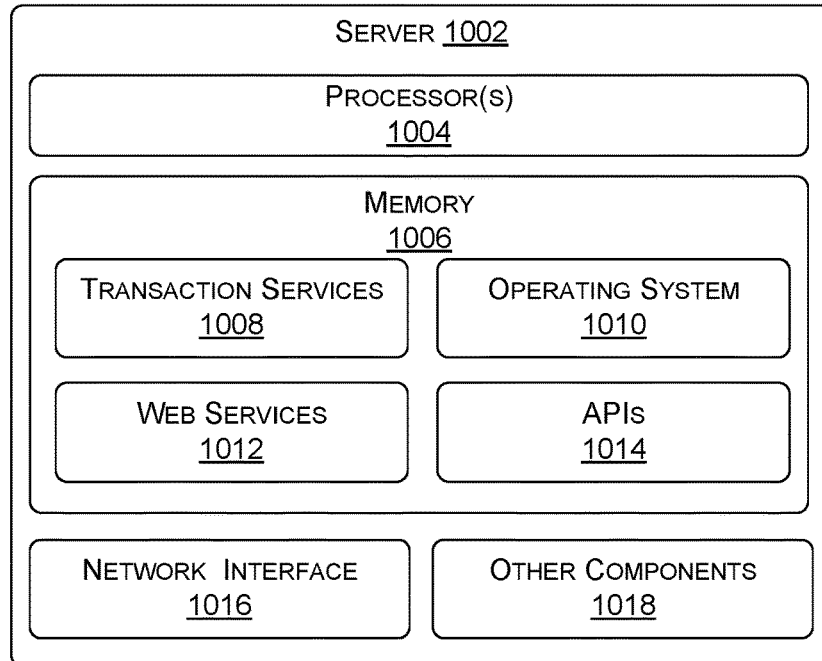
FIG. 10 is a block diagram of an example server that may be used to implement the payment service described herein.

FIG. 10 shows an example of a server 1002, which may be used to implement the functionality of the payment service 102 as described herein. Generally, the payment service 102 may be implemented by a plurality of servers 1002.

In the illustrated example, the server 1002 includes at least one processor 1004 and associated memory 1006. Each processor 1004 may itself comprise one or more processors or processing cores. For example, the processor 1004 can be implemented as one or more microprocessors, microcomputers, microcontrollers, digital signal processors, central processing units, state machines, logic circuitries, and/or any devices that manipulate signals based on operational instructions. In some cases, the processor 1004 may be one or more hardware processors and/or logic circuits of any suitable type specifically programmed or configured to execute the algorithms and processes described herein. The processor 1004 can be configured to fetch and execute computer-readable processor-executable instructions stored in the memory 1006.

Depending on the configuration of the server 1002, the memory 1006 may be an example of tangible non-transitory computer storage media and may include volatile and non-volatile memory and/or removable and non-removable media implemented in any type of technology for storage of information such as computer-readable processor-executable instructions, data structures, program modules or other data. The memory 1006 may include, but is not limited to, RAM, ROM, EEPROM, flash memory, solid-state storage, magnetic disk storage, optical storage, and/or other computer-readable media technology. Further, in some cases, the server 1002 may access external storage, such as RAID storage systems, storage arrays, network attached storage, storage area networks, cloud storage, or any other medium that can be used to store information and that can be accessed by the processor 1004 directly or through another computing device or network. Accordingly, the memory 1006 may be computer storage media able to store instructions, modules or components that may be executed by the processor 1004. Further, when mentioned, non-transitory computer-readable media exclude media such as energy, carrier signals, electromagnetic waves, and signals per se.

The memory 1006 may be used to store and maintain any number of functional components that are executable by the processor 1004. In some implementations, these functional components comprise instructions or programs that are executable by the processor 1004 and that, when executed, implement operational logic for performing the actions and services attributed above to the payment service 102. Functional components stored in the memory 1006 may include a transaction services component 1008 that receives, processes and responds to transaction requests such as authorization requests, capture requests, and quick deposit requests in accordance with the preceding discussion.

Additional functional components may include an operating system 1010 and a web services component 1012. The memory 1006 may also store APIs (application programming interfaces) 1014 that are used for communications between the server 1002 and the POS devices 104. The memory 1006 may also store data, data structures and the like, that are used by the functional components.

The server 1002 may have a network communications interface 1016, such as an Ethernet communications interface, which provides communication by the server 1002 with other servers, with the Internet, and ultimately with the POS devices 104.

The server 1002 may of course include many other logical, programmatic, and physical components 1018 that are not specifically described herein.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system, comprising:
   one or more processors;
   one or more non-transitory computer-readable media storing instructions executable by the one or more processors, wherein the instructions program the one or more processors to perform acts comprising:
      receiving, by one or more computing devices of a payment service and from a plurality of point-of-sale (POS) devices associated with a plurality of payees, a plurality of payment transactions between a payee of the plurality of payees and one or more payers, wherein each POS device of the plurality of POS devices includes an instance of a POS application that enables the POS device to communicate the plurality of payment transactions to the payment service via a network, and wherein each payment transaction of the plurality of payment transactions has an associated payment amount;
      performing, by the one or more computing devices, an analysis of one or more payment transactions of the plurality of payment transactions to identify one or more eligible payment transactions of the plurality of payment transactions that are eligible for expedited payment to the payee;
      transmitting, by the one or more computing devices and after performing the analysis, a notification about the one or more eligible payment transactions for display by at least one POS device, of the plurality of POS devices, associated with the payee;
      receiving, by the one or more computing devices and from the at least one POS device associated with the payee, an indication that the payee has selected the one or more eligible payment transactions for the expedited payment to the payee;
      initiating, by the one or more computing devices, after performing the analysis, the expedited payment for the one or more eligible payment transactions; and
      initiating, by the one or more computing devices and after initiating the expedited payment for the one or more eligible payment transactions, a non-expedited payment to the payee, wherein the non-expedited payment is for at least one payment transaction of the plurality of payment transactions remaining after the expedited payment of the one or more eligible payment transactions is initiated.

2. The system as recited in claim 1, wherein performing the analysis of the one or more payment transactions of the plurality of payment transactions to identify the one or more eligible payment transactions that are eligible for the expedited payment to the payee comprises at least:
   analyzing a particular payment transaction of the one or more payment transactions of the plurality of payment transactions;
   determining, based at least in part on analyzing the particular payment transaction, a score associated with a risk of subsequent chargeback for the particular payment transaction;
   determining that the score is lower than a threshold score; and
   identifying, based at least in part on determining that the score is lower than the threshold score, that the particular payment transaction is eligible for the expedited payment to the payee.

3. The system as recited in claim 2, wherein analyzing the particular payment transaction comprises analyzing the particular payment transaction using at least one of transaction data, merchant data, or customer data.

4. The system as recited in claim 1, wherein performing the analysis further identifies one or more other payment transactions of the plurality of payment transactions that are not eligible for the expedited payment to the payee.

5. The system as recited in claim 4, wherein performing the analysis of the one or more payment transactions of the plurality of payment transactions to identify the one or more other payment transactions of the plurality of payment transactions that are not eligible for the expedited payment to the payee comprises at least:
   analyzing a particular payment transaction of the one or more payment transactions of the plurality of payment transactions;
   determining, based at least in part on analyzing the particular payment transaction, a score associated with a risk of subsequent chargeback for the particular payment transaction;
   determining that the score exceeds a threshold score; and
   identifying, based at least in part on determining that the score exceeds the threshold score, that the particular payment transaction is not eligible for the expedited payment to the payee.

6. The system as recited in claim 1, the acts further comprising:
   determining that a payment instrument associated with the payee supports the expedited payment; and
   determining, based at least in part on determining that the payment instrument supports the expedited payment, that the one or more eligible payment transactions of the plurality of payment transactions are eligible for the expedited payment to the payee.

7. The system as recited in claim 1, the acts further comprising:
   after initiating the expedited payment, determining that it is a close of a business day for the payee associated with the at least one POS device,
   wherein initiating the non-expedited payment is based at least in part on determining that it is the close of the business day.

8. The system as recited in claim 1, wherein transmitting the notification causes the at least one POS device of the payee to display a user interface element that is selectable to initiate the expedited payment.

9. A method comprising:
   receiving, by one or more computing devices of a payment service and from a plurality of point-of-sale (POS) devices associated with a plurality of payees, a plurality of payment transactions between a payee of the plurality of payees and one or more payers, wherein each POS device of the plurality of POS devices includes an instance of a POS application that enables the POS device to communicate the plurality of payment transactions to the payment service via a network, and wherein each payment transaction of the plurality of payment transactions has an associated payment amount;

performing, by the one or more computing devices, an analysis of one or more payment transactions of the plurality of payment transactions to identify one or more eligible payment transactions of the plurality of payment transactions that are eligible for expedited payment to the payee;

transmitting, by the one or more computing devices and after performing the analysis, a notification about the one or more eligible payment transactions for display by at least one POS device of the payee;

receiving, by the one or more computing devices and from the at least one POS device of the payee, an indication that the payee has selected the one or more eligible payment transactions for the expedited payment to the payee;

initiating, by the one or more computing devices, after performing the analysis, the expedited payment for the one or more eligible payment transactions; and initiating, by the one or more computing devices and after initiating the expedited payment for the one or more eligible payment transactions, a non-expedited payment, wherein the non-expedited payment is for at least one payment transaction of the plurality of payment transactions remaining after the expedited payment of the one or more eligible payment transactions is initiated.

10. The method of claim 9, wherein performing the analysis of the one or more payment transactions of the plurality of payment transactions to identify the one or more eligible payment transactions that are eligible for the expedited payment to the payee comprises:

analyzing a particular payment transaction of the one or more payment transactions of the plurality of payment transactions;

determining, based at least in part on analyzing the particular payment transaction, a score associated with a risk of subsequent chargeback for the particular payment transaction;

determining that the score is lower than a threshold score; and identifying, based at least in part on determining that the score is lower than the threshold score, that the particular payment transaction is eligible for the expedited payment to the payee.

11. The method of claim 10, wherein analyzing the particular payment transaction comprises analyzing the particular payment transaction using at least one of transaction data, merchant data, or customer data.

12. The method of claim 9, wherein performing the analysis further identifies one or more other payment transactions of the plurality of payment transactions that are not eligible for the expedited payment to the payee.

13. The method of claim 12, wherein performing the analysis of the one or more payment transactions of the plurality of payment transactions to identify the one or more other payment transactions of the plurality of payment transactions that are not eligible for the expedited payment to the payee comprises at least:

analyzing a particular payment transaction of the one or more payment transactions of the plurality of payment transactions;

determining, based at least in part on analyzing the particular payment transaction, a score associated with a risk of subsequent chargeback for the particular payment transaction;

determining that the score exceeds a threshold score; and identifying, based at least in part on determining that the score exceeds the threshold score, that the particular payment transaction is not eligible for the expedited payment to the payee.

14. The method of claim 9, wherein transmitting the notification causes the at least one POS device of the payee to display a user interface element that is selectable to initiate the expedited payment.

15. The method of claim 9, further comprising:

determining that a payment instrument associated with the payee supports the expedited payment; and determining, based at least in part on determining that the payment instrument supports the expedited payment, that the one or more eligible payment transactions of the plurality of payment transactions are eligible for the expedited payment to the payee.

16. The method of claim 9, further comprising:

after initiating the expedited payment, determining that it is a close of a business day for the payee associated with the at least one POS device; and wherein initiating the non-expedited payment is based at least in part on determining that it is the close of the business day.

17. One or more non-transitory computer-readable media storing instructions that, when executed, cause one or more processors to perform acts comprising:

receiving, by one or more computing devices of a payment service and from a plurality of point-of-sale (POS) devices associated with a plurality of payees, a plurality of payment transactions between a payee of the plurality of payees and one or more payers, wherein each POS device of the plurality of POS devices includes an instance of a POS application that enables the POS device to communicate the plurality of payment transactions to the payment service via a network, and wherein each payment transaction of the plurality of payment transactions has an associated payment amount;

performing, by the one or more computing devices, an analysis of one or more payment transactions of the plurality of payment transactions to identify one or more eligible payment transactions of the plurality of payment transactions that are eligible for expedited payment to the payee;

transmitting, by the one or more computing devices and after performing the analysis, a notification about the one or more eligible payment transactions for display by at least one POS device of the payee;

receiving, by the one or more computing devices and from the at least one POS device of the payee, an indication that the payee has selected the one or more eligible payment transactions for the expedited payment to the payee;

initiating, by the one or more computing devices, after performing the analysis, the expedited payment for the one or more eligible payment transactions; and initiating, by the one or more computing devices and after initiating the expedited payment for the one or more eligible payment transactions, a non-expedited payment, wherein the non-expedited payment is for at least one payment transaction of the plurality of payment transactions remaining after the expedited payment of the one or more eligible payment transactions is initiated.

18. The one or more non-transitory computer readable media of claim 17, wherein performing the analysis of the one or more payment transactions of the plurality of payment transactions to identify the one or more eligible payment transactions that are eligible for the expedited payment to the payee comprises:

analyzing a particular payment transaction of the one or more payment transactions of the plurality of payment transactions;

determining, based at least in part on analyzing the particular payment transaction, a score associated with a risk of subsequent chargeback for the particular payment transaction;

determining that the score is lower than a threshold score; and identifying, based at least in part on determining that the score is lower than the threshold score, that the particular payment transaction is eligible for the expedited payment to the payee.

19. The one or more non-transitory computer readable media of claim 17, the acts further comprising:

determining that a payment instrument associated with the payee supports the expedited payment; and determining, based at least in part on determining that the payment instrument supports the expedited payment, that the one or more eligible payment transactions of the plurality of payment transactions are eligible for the expedited payment to the payee.

20. The one or more non-transitory computer readable media of claim 17, wherein transmitting the notification causes the at least one POS device of the payee to display a user interface element that is selectable to initiate the expedited payment.

* * * * *